June 11, 1963     H. KROCHTA     3,093,468
GAS SCRUBBER

Filed Jan. 23, 1961     4 Sheets-Sheet 1

INVENTOR.
HARRY KROCHTA
BY Arthur H. Seidel
ATTORNEY

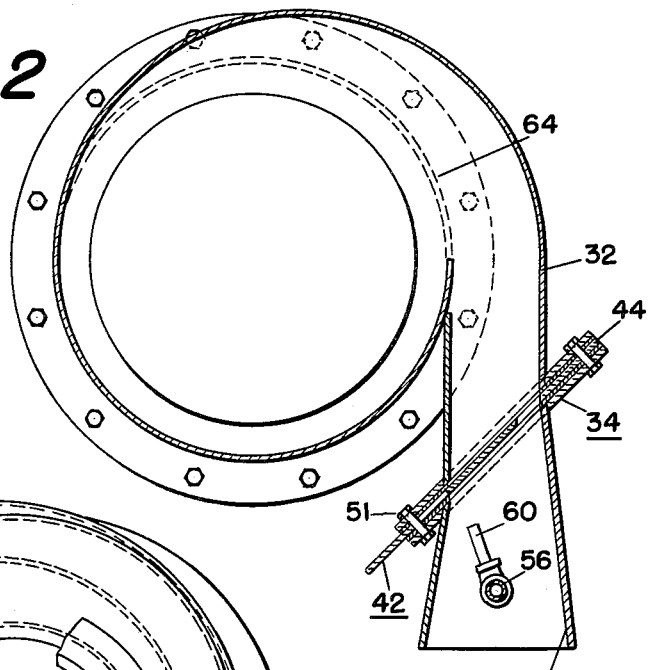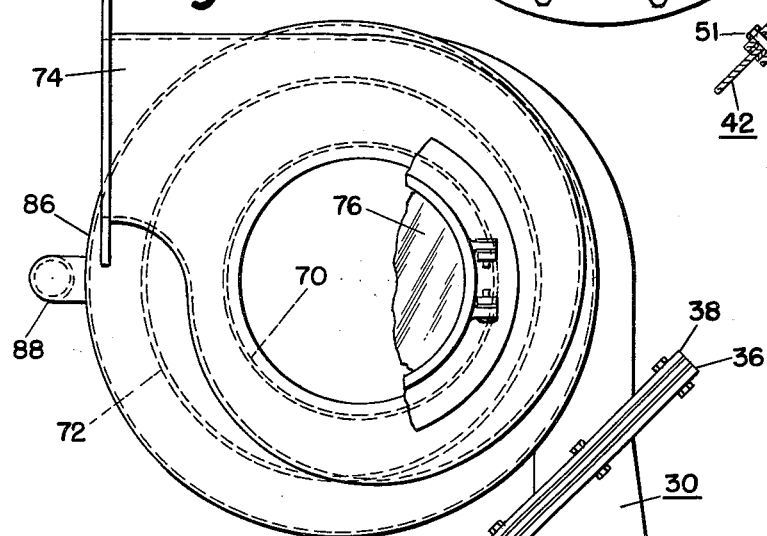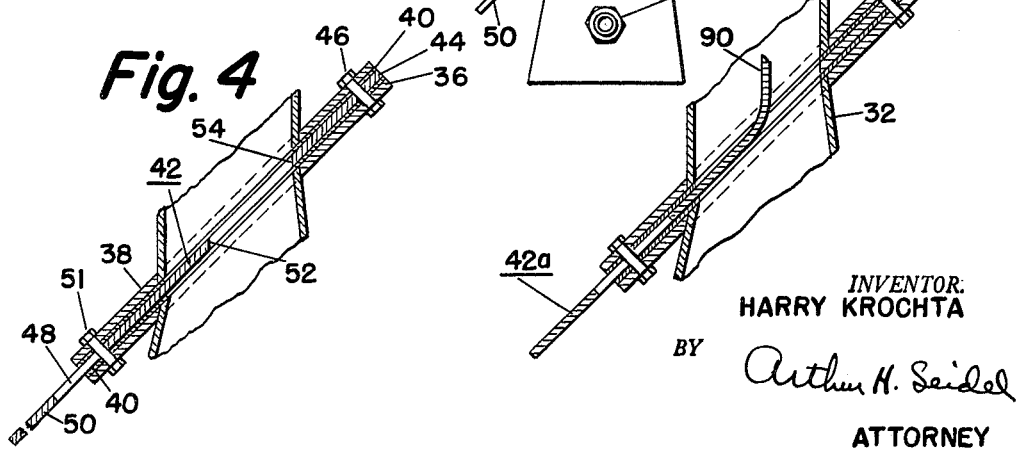

*INVENTOR.*
HARRY KROCHTA
BY Arthur H. Seidel
ATTORNEY

United States Patent Office 3,093,468
Patented June 11, 1963

3,093,468
GAS SCRUBBER
Harry Krochta, East Northport, N.Y., assignor to The Ducon Company, Inc., Mineola, N.Y., a corporation of New York
Filed Jan. 23, 1961, Ser. No. 85,175
18 Claims. (Cl. 55—238)

The present invention is directed to a gas scrubber, and more particularly to a highly efficient device by which extremely small size suspended particulate matter, such as liquid particles like acid mists and tar fogs, and solid particles such as dusts may be removed from a gaseous fluid by agglomeration and centrifugal separation.

This application is a continuation-in-part of my copending application Serial No. 803,665, filed April 2, 1959, and entitled Gas Scrubber, now abandoned.

The use of centrifugal devices for the removal of particulates suspended or entrained in gases, such as air and the like is well known to the art. A number of serious problems have developed in connection with such centrifugal devices.

Thus, it has been found most difficult with conventional centrifugal gas scrubbers to accommodate to varying types of suspended particulates. Thus, where the suspended particulates being removed from the gas change in chemical composition and/or physical characteristics, and/or particle sizes, and/or concentrations, or where the volume of gas to be handled is varied appreciably, it is difficult to adjust a given centrifugal gas scrubber so that the same performs efficiently under a wide variety of situations.

Where extremely fine particles are encountered, conventional centrifugal gas scrubbers are relatively inefficient. Attempts have been made to improve the efficiency of centrifugal gas scrubbers by increasing the shell height, and/or introducing scrubbing liquid into the spinning gas in order to promote agglomeration and separation of particulates. Although these expedients as heretofore practiced have proved to be successful for many applications, centrifugal gas scrubbers have not proved efficient heretofore in the collection of sub-micron particles.

Also, as the cost of a centrifugal gas scrubber is largely a function of its size, increasing the height of the centrifugal gas scrubber, greatly increases the cost thereof, which is of particular concern in those instances where special construction materials are required for corrosion resistance, etc.

The introduction of water into the spinning gas stream to effect agglomeration of the suspended particulates may also lead to the necessity for increasing the height of the centrifugal gas scrubber with the concomitant expense thereof. Thus, experience has demonstrated that unless the height of the centrifugal gas scrubber is appreciable there will be a marked tendency for a sheet of liquid to creep along the inner wall surface of the shell of the centrifugal gas scrubber and to be blown outwardly with the gas discharged from the gas scrubber. This is of course, highly undesirable.

This invention has as an object the provision of a highly efficient centrifugal gas scrubber.

This invention has as another object the provision of a centrifugal gas scrubber which may be utilized to remove extremely fine particulate matter, including sub-micron particles.

This invention has as yet another object the provision of a centrifugal gas scrubber of relatively small height, namely a height to diameter ratio of as low as slightly more than 1 to 1.

This invention has a still further object the provision of a centrifugal gas scrubber which can be adjusted to accommodate to a wide variety of types of suspended particulate matter, and to a wide variation in gas volumes, all of the while maintaining high collection efficiency.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings wherein like reference characters refer to like parts:

FIGURE 2 is a sectional view taken on line 2—2 of FIGURE 1.

FIGURE 3 is a plan view looking down from line 3—3 of FIGURE 1, with parts being broken away for the sake of clarity of presentation.

FIGURE 4 is an enlarged sectional view revealing the construction of the valve plate embodiment of the gas scrubber of FIGURE 1, with such valve plate being in a different position from that shown in FIGURE 2.

FIGURE 5 is a sectional view revealing another valve plate embodiment which may be used in the gas scrubber of the present invention.

Figure 6:
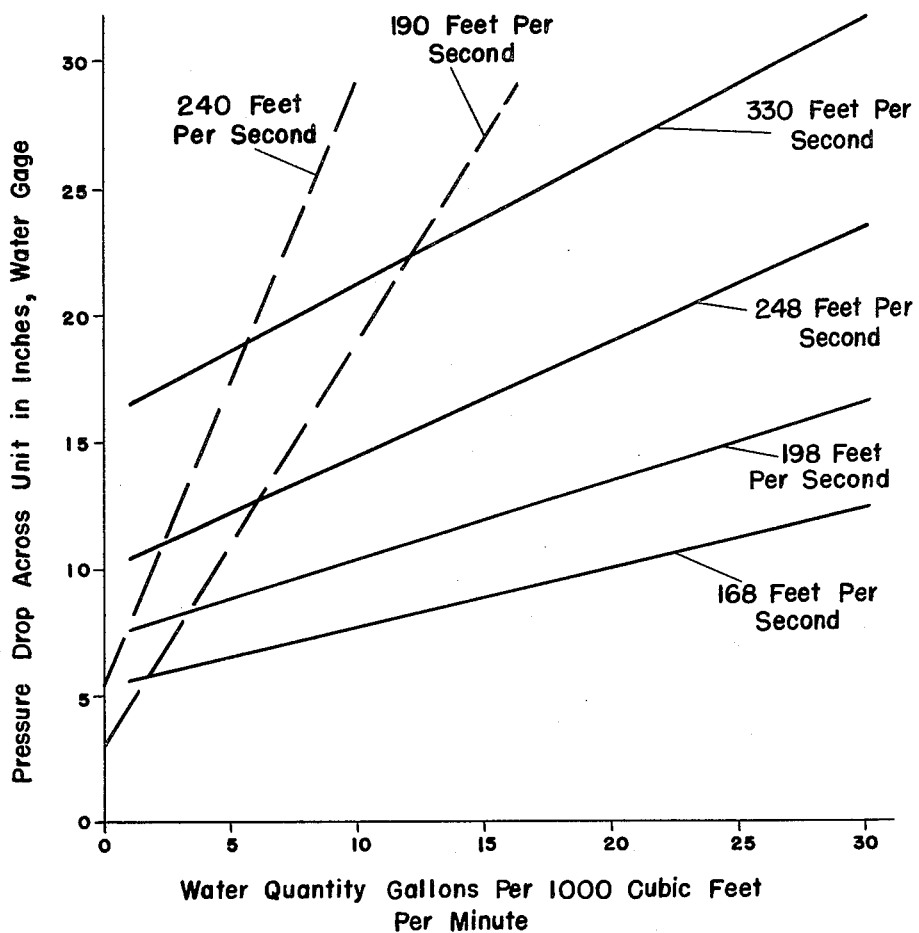

FIGURE 6 is a graph of the comparison between the subject scrubber and a unit in which water is injected perpendicular to the gas stream plotting the pressure drop versus the water rate at parameters of constant air velocity through the same size orifice opening, with the data for the subject scrubber being shown in full line, and the data for the unit in which water is injected perpendicular ot the gas stream being shown in broken line.

Figure 7:
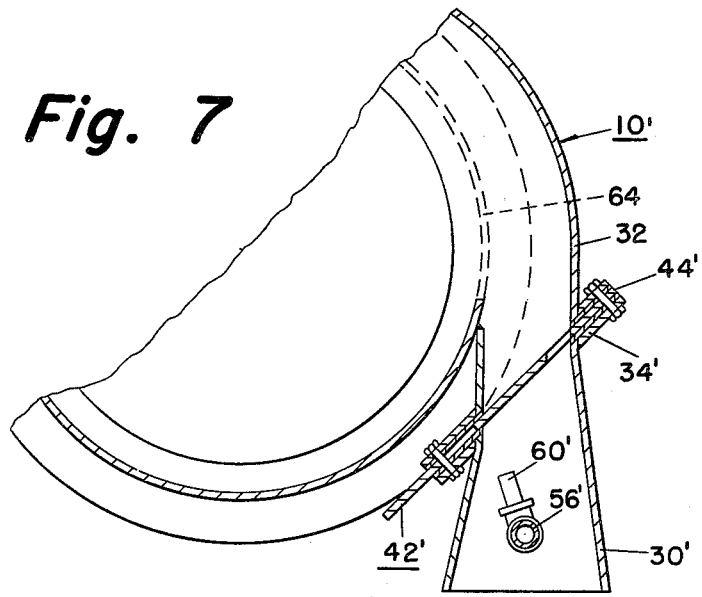

FIGURE 7 is a sectional view of an alternative embodiment similar to the sectional view in FIGURE 2.

Figure 8:
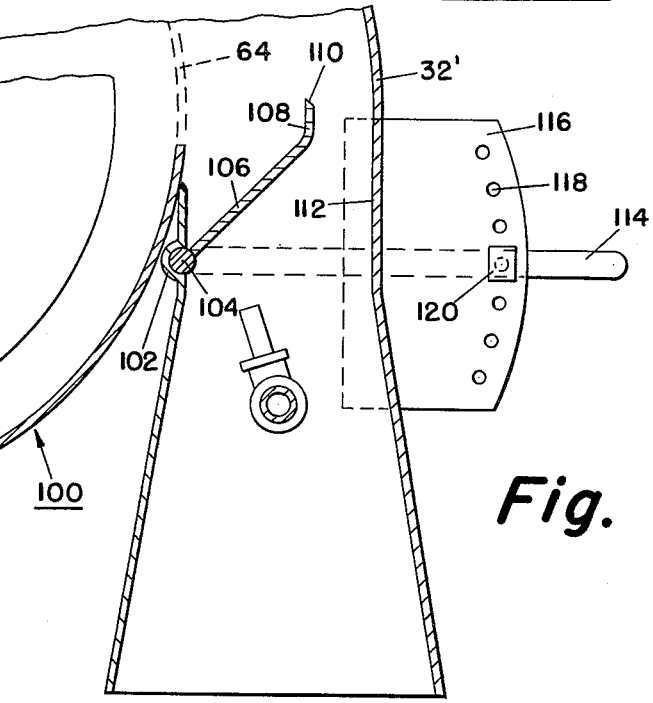

FIGURE 8 is a sectional view of still another embodiment of the present invention similar to the view in FIGURE 2.

The gas scrubber of the present invention comprises an agglomeration region having a variable orifice and means for introducing a scrubbing liquid to the dirty gas to effect agglomeration, and a centrifugal separator wherein removal of the agglomerates is effected.

Referring to the drawings and initially to FIGURES 1 through 4 inclusive, the gas scrubber of the present invention is designated generally as 10. The use of the term "gas scrubber" herein is to be taken in its broadest sense.

The gas scrubber 10 comprises a cylindrical shell 12 to which is secured the conically shaped basal section 14 comprising the sludge outlet 15. Securement between the cylindrical shell 12 and the basal section 14 is achieved by bolting the annular flange 16 at the base of cylindrical shell 12 to the annular flange 18 at the top of basal section 14 by means of the bolts and nuts 20.

The top section 22 is secured to the top of cylindrical shell 12 by bolting the annular flange 24 at the top of cylindrical shell 12 to the annular flange 26 at the base of top section 22 by means of bolts and nuts 28.

The aforesaid bolted construction provides for facile disassembly of the dust collector 10. However, other types of construction may be utilized, and the casing of the gas scrubber 10 may be formed integrally as by the use of welding techniques.

The "dirty" gas inlet 30 is secured to the wall of cylindrical shell 12, and comprises a conduit 32 which enters into the cylindrical shell 12 tangentially. Adjustable valve means 34 are provided within the conduit 32. Such adjustable valve means 34 comprise a pair of guide flanges 36 and 38 secured to the wall of the conduit 32. Gasket material 40 is provided on the juxtaposed faces of the guide flanges 36 and 38, and the slidable valve element 42 is reciprocally movable intermediate the gasketed faces of the guide flanges 36 and 38. It is to be noted that the guide flanges 36 and 38, and hence the slide valve element 42, are not disposed across the conduit 32 in the plane of the perpendicular to the major axis of such conduit 32, but instead, are disposed at an angle to such perpendicular. Thus, the outer portion of the slide valve element 42 is closer to the mouth of the dirty gas inlet 30 than is the inner portion of such slide valve element 42.

In order to permit the facile movement of the slide valve element 42 intermediate the guide flanges 36 and 38 a spacer 44 is provided intermediate the gasketed juxtaposed faces of the guide flanges 36 and 38 at the side of the conduit 32 opposite from the side thereof through which the slide valve element 42 is received. Bolts and nuts 46 maintain the guide flanges 36 and 38 and spacer 44 in firm alignment.

The slide valve element 42, which in the embodiment shown in FIGURES 1 through 4 comprises a flat plate, includes an elliptical slot 48 in the outside or handle portion 50 which projects outside of the conduit 32. The bolt 51, which is one of the bolts holding the guide flanges 36 and 38 in firm alignment, may be used as a stop guide for limiting the movement of the slide valve element. As seen by a comparison between FIGURES 2 and 4, the slide valve element 42 may be moved through any of a large variety of positions between the position in which the slide valve element 42 projects within the conduit 32 to the maximum extent (FIGURE 2), and the position in which the slide valve element extends outside of the conduit 32 to the maximum extent (FIGURE 4).

The free edge 52 of slide valve element 42 may be beveled, so that a streamlined edge is presented to the incoming gas stream. The free inside edge 54 of the spacer 44 should preferably lie generally in the plane of the inside wall surface of the conduit 32.

The wash liquid nozzle inlet 56 extends through the wall of the conduit 32 intermediate the mouth thereof and the slide valve element 42. The wash liquid nozzle inlet 56 comprises the elbow 58 at its bottom end in which is carried the wash liquid nozzle 60. The wash liquid nozzle 60 is axially disposed in respect to the path of the dirty gas which enters the conduit 32 and is in a position so that wash liquid impinges upon the valve element 42. As seen particularly in FIGURE 2, the nozzle 60 is juxtaposed to the portion of the slide valve element 42 which is spaced from the orifice intermediate the free edge 52 of slide valve element 42 and free edge 54 of spacer 44. Thus, for the reasons set forth below, it is most desirable that the atomization of the liquid discharged from the wash liquid nozzle 60 be effected by impingement upon the face of the slide valve element 42, and that discharge of the liquid from the wash liquid nozzle 60 into the orifice intermediate the free edge 52 of slide valve element 42 and the free edge 54 of spacer 44 be avoided.

A wide variety of nozzles for discharging one or more streams of liquid onto the face of the slide valve element 42 may be utilized as the wash liquid nozzle 60.

A conical baffle plate 62 is provided within the cylindrical shell 12 below the entrance port 64 of the conduit 32. The conical baffle plate 62 may be maintained in coaxial alignment in respect to the interior of the cylindrical shell 12 by means of the spider 66, which may be welded or otherwise fastened to the inner wall surface of the basal section 14.

Figure 1:
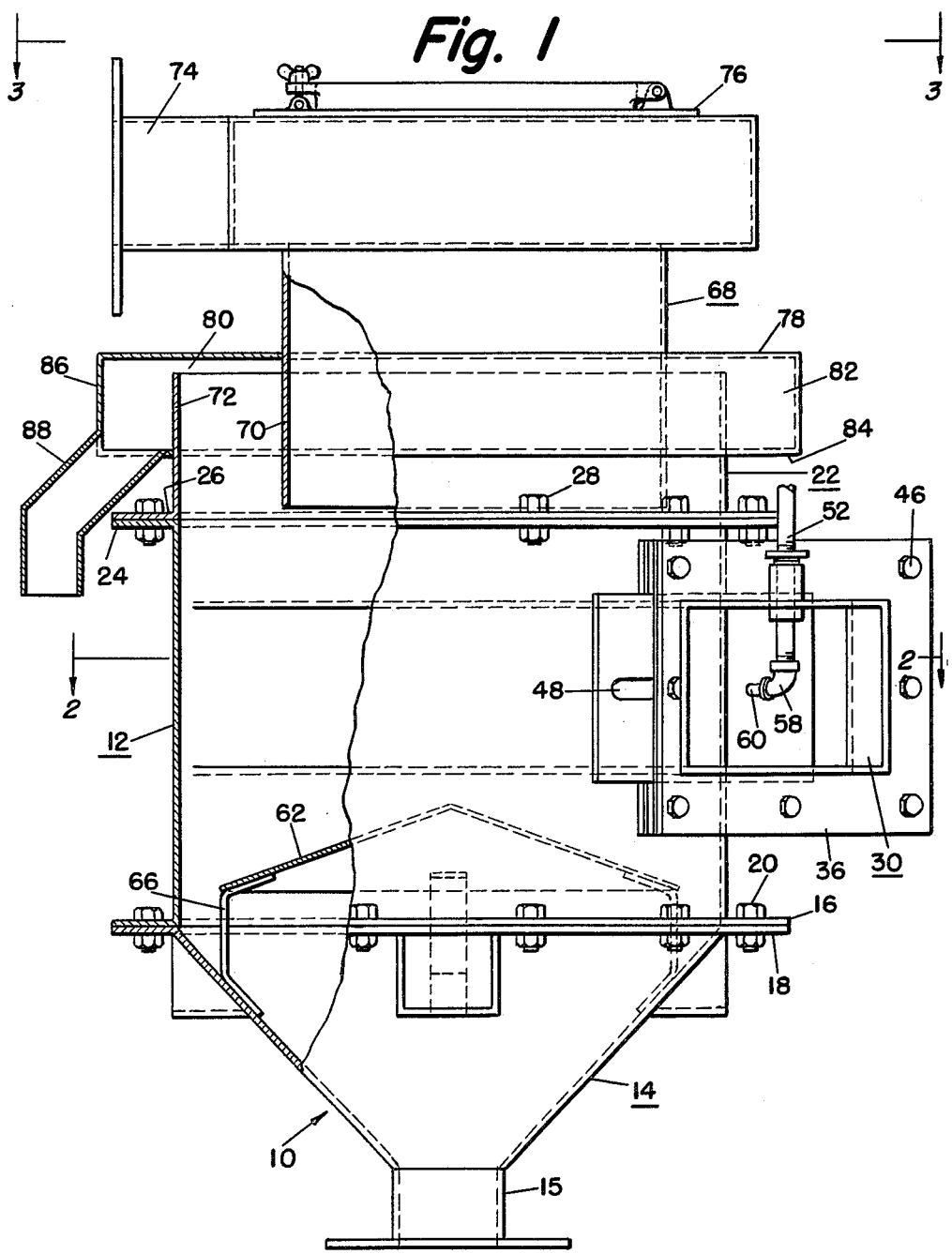
FIGURE 1 is a side elevational view of the centrifugal gas scrubber of the present invention, with parts being broken away for clarity and to reveal the internal structure of the centrifugal gas scrubber.

The top section 22 comprises the clean gas outlet 68 which includes a cylindrical conduit 70 which depends into the interior of top section 22 for an appreciable distance. The cylindrical conduit 70 is spaced from the surface of the inner wall 72 of top section 22, as seen in FIGURE 1. A clean gas scroll-type outlet duct 74 may be provided on the top end of cylindrical conduit 70. An inspection door 76 may be provided in the top face of the clean gas outlet duct 74.

The inner wall 72 of top section 22 is not joined to the top wall 78 of top section 22, but rather an annular flow space 80 is provided intermediate the uppermost edge of the inner wall 72 and the juxtaposed face of the top wall 78.

The annular flow space 80 is in communication with the chamber 82 which extends about the top section 22 at its upper end. Such chamber 82 is provided with a floor 84 which projects outwardly from the inner wall 72 until it joins the wall 86 which depends from the top wall 78. A drain pipe 88 is provided in the floor 84 of the chamber 82.

The operation of the gas scrubber 10 of the present invention is as follows:

Gas with suspended particulates enters into the gas scrubber 10 through the gas inlet 30. The dirty gas is joined by the stream of wash liquid which is discharged from the wash liquid nozzle 60 onto the slide valve element 42. The impingement of the stream of wash liquid from the wash liquid nozzle 60 on the slide valve element 42 effects atomization of the wash liquid. Further atomization of the wash liquid occurs at the orifice intermediate the free edge 52 of slide valve element 42 and the free edge 54 of spacer 44, as the atomized wash liquid particles encounter the high velocity gas stream at such orifice (the gas stream attains its maximum velocity at such orifice). In this manner the orifice intermediate the free edge 52 of slide valve element 42 and free edge 54 of spacer 44 is provided with a liquid curtain of fine wash liquid particles. Since maximum agglomeration of the suspended particulates within the gas occurs in the region of maximum gas velocity, and since such region also serves to effect maximum breakup of the wash liquid particles, the agglomeration action of the wash liquid introduced through the wash liquid nozzle 60 is most efficient. Furthermore, since the orifice between the free edge 52 of slide valve element 42 and the free edge 54 of spacer 44 is provided with a dense curtain of fine size wash liquid particles, the possibilities of suspended particulates bypassing the wash liquid particles in the agglomeration zone of high velocity is minimized. Thus, the more thorough the extent of the atomization, the greater the number of the wash liquid particles in the path of the suspended particulates, and the greater the possibility for agglomerations in the zone of maximum gas velocity. By impinging the wash liquid stream from the wash liquid nozzle 60 on the slide valve element 42, and avoiding discharging such wash liquid stream into the orifice intermediate the free edge 52 of slide valve element 42 and the free edge 54 of spacer 44 atomization of the wash liquid is achieved prior to the passage of the wash liquid into the zone of maximum gas velocity. Since the high velocity gas stream will work to atomize the thus-formed wash liquid particles still further, the amount of loss of energy of the high velocity gas stream (reflected in pressure drop) to achieve a given degree of wash liquid atomization is reduced.

From the high gas velocity zone, the gas carrying agglomerated particles moves through the conduit 32 into the cylindrical shell 12. Within the cylindrical shell 12 and the top section 22, the agglomerated particles are separated from the high velocity gas stream by centrifugal action, and move downwardly along the wall surface of the gas scrubber 10 into the basal section 14 and out through the sludge outlet 15.

The clean gas is removed through the clean gas outlet 68, passing up through the cylindrical conduit 70 and out the clean gas outlet duct 74.

Since there is an appreciable quantity of wash liquid introduced into the gas stream, there is a tendency for the liquid to rise up along the wall surface of the gas scrubber 10, towards its roof. However, the movement of the liquid sheet along the wall surface of the interior of the gas scrubber 10 to the roof surface of the top wall 78 from whence it could enter the clean gas outlet 68 and be blown out with the clean gas is prevented by the annular flow space 80 intermediate the inner wall 72 of top section 22 and the top wall 78 of top section 22. Thus, the rising liquid sheet enters the annular flow space 80 into the chamber 82. The chamber 82 is a relatively dead chamber compared with the interior of the cylindrical shell 12 and the interior of the top section 22, and the liquid collects as a pool on the floor 84 of the chamber 82 from whence it is removed by the drain pipe 88.

The conical baffle plate 62 reduces the tendency of the liquid within the gas scrubber 10 to become re-entrained within the gas stream, as it provides a means of separating collected liquid solution or slurry from the spinning gas stream immediately above it. The sloping surface of the conical baffle plate 62 prevents the accumulation of liquid on the plate 62. This is most desirable as such accumulation would also be subject to possible re-entrainment.

By the provision of the chamber 82 and the conical baffle plate 62, a centrifugal gas scrubber of relatively small height may be provided, notwithstanding the introduction of substantial amounts of liquid through the wash liquid nozzle 60.

In the embodiment of the gas scrubber shown in FIGURE 5, a slide valve element 42a is substituted for the slide valve element 42 of the gas scrubber embodiment of FIGURES 1 through 4. The remainder of the gas scrubber in the embodiment of FIGURE 5 may be identical to that of the embodiment of FIGURES 1 through 4.

The slide valve element 42a is provided with a curved end portion 90 which may be substantially parallel to, or flaring outwardly away from, the juxtaposed inner wall surface of the conduit 32. In the embodiment shown in FIGURE 5 the slide valve element 42a enables the substantial equivalent of an adjustable Venturi to be provided within the conduit 32, with a resultant possible reduction in overall pressure drop, as compared with the embodiment of FIGURES 1 through 4 for a given collection efficiency.

It is to be noted in reference to both the slide valve element 42 and the slide valve element 42a, that the angular disposition of these members across the conduit 32 enables the maximum gas velocity to be achieved at the orifice without the drastic pressure drop which would be effected were such slidable valve elements disposed in the plane of the perpendicular to the longitudinal axis of the conduit 32. This angular disposition of the slide valve element in respect to the path of the inlet gas stream is of great significance in terms of wash liquid distribution across the orifice opening and in minimizing the overall pressure drop or power requirement for a given collection efficiency. The latter results from the diminishing of the "sudden contraction" effect brought about by the angular disposition.

FIGURE 7 discloses an alternative embodiment of the present invention designated generally as 10'. The gas scrubber 10' is identical with the gas scrubber 10 except as pointed out hereinafter. FIGURE 7 is a transverse sectional view similar to FIGURE 2. The sole distinction between the gas scrubber 10' and the gas scrubber 10 is the position of the slidable gate valve 42'. In the gas scrubber 10', the valve 42', which is identical with valve 42, is positioned immediately adjacent the tangential entrance 64. In this manner, the gas scrubber 10' is capable of utilizing the high velocity of the stream of particle laden gas thereby increasing the efficiency of the gas scrubber 10'.

In the gas scrubber 10' the valve 42' is positioned as close to the entrance port 64 as possible. In the gas scrubber 10, the valve 42 is spaced from the entrance port 64 by a short length of the pipe 30 which has the effect of slightly decreasing the velocity of the gas stream. Thus, the sole difference between the gas scrubber 10' and the gas scrubber 10 is the positioning of the valve 42' immediately adjacent the entrance port 64. I have found that by utilizing the entire velocity of the gas stream that the efficiency of the centrifugal gas scrubber 10' is substantially increased since it aids in the centrifugal separation. The remaining elements in FIGURE 7 not specifically mentioned above are identical with the corresponding structure shown in FIGURE 2 and therefore need not be described in detail.

FIGURE 8 shows another embodiment of the present invention designated generally as 100. In the gas scrubber 100, the conduit 32' is provided with an integral socket 102. The socket 102 is integral with the walls of the conduit 32' and rotatably receives the shaft 104. The shaft 104 is fixedly secured to the valve element 106. The valve element 106 is provided with a curved end portion 108 adjacent the free edge 110.

As shown more clearly in FIGURE 8, the valve element 106 is rotatably mounted within a Venturi section of the conduit 32'. The free edge 110 cooperates with the portion 112 of the conduit 32' to effect a valving action in the closed disposition of the valve element 106. The ends of the shaft 104 extend through the walls of the conduit 32'. The lowermost end of the shaft 104 is fixedly secured to one end of an operating handle 114. The operating handle 114 is disposed below the index plate 116. The index plate 116 is fixedly secured to a lowermost surface on the conduit 32'.

The handle 114 is provided with a hole therein. The index plate 116 is provided with a plurality of holes 118 disposed in an arcuate path with the shaft 104 at the center of the arcuate path. Therefore, as the handle 114 is rotated downwardly in FIGURE 8, the valve element 106 is rotated to a closed position. At the same time, the hole in the handle 114 moves in a path directly below the holes 118. A removable indexing pin 120 is utilized to retain the valve element 106 in any one of a plurality of partially open or closed positions. The indexing pin 120 is provided with a stud capable of being extended through one of the holes 118 and the hole in the handle 114. In all other respects, the gas scrubber 100 is identical with the gas scrubber 10'. That is, the valve element 106 is positioned as close as possible to the entrance port 64. In this manner, the centrifugal separation within the gas scrubber 100 is more efficiently effected.

The method of water introduction by the impingement of water on the slide valve element causes considerably less pressure drop (especially at the higher water rates) for the overall unit than would be the case if water were introduced radially and transverse to the gas stream. The comparison can be seen from the curves of the graph of FIGURE 6. The full line curves represent pressure drop versus water rate in the gas scrubbers of the present invention at parameters of constant air velocity through the orifice opening of a 400 cubic feet per minute test unit. The two curves shown in broken line represent calculated pressure drops for various water rates at velocities of 190 feet per second and 240 feet per second with water introduced perpendicular to the gas stream (this calculated data was corroborated with gas scrubbers having an orifice of the Venturi type). It can be seen, for instance, that at a gas velocity of 240 feet per second and a water rate of 10 gallons per 1000 cubic feet per minute, the pressure drop for water introduction in the subject scrubber is approximately 14 inches w.g. while for transverse injection it would be 29 inches w.g. At the same velocity and 15 gallons per 1000 cubic feet per minute, the pressure drop of the present invention is 16 inches w.g. as compared with 40 inches w.g. with water introduced transversely. At lower water rates the difference is less significant than at the higher rates.

While I do not wish to be bound by any explanation of the aforesaid, I believe that the apparent reduced pressure drop is a result of either or both of the following mechanisms: (1) the impingement of water on the movable valve element causes liquid atomization, the degree of which is affected by liquid jet velocity at the point of impingement, i.e., the greater the liquid flow through a given jet, the higher the velocity and the finer the liquid atomization which results from impingement. With finer atomization on liquid particles, there is less resistance offered in the zone of high gas velocity (orifice opening) and therefore a reduction in pressure drop results; and (2) the velocity of the liquid leaving the edge of the movable valve element and entering the high velocity gas stream essentially co-axially (followed by a sudden reduction in velocity upon entering the centrifugal separator body) can cause an aspirating effect which induces gas flow and thereby reduces the static pressure load on the prime air or gas mover (fan, blower, etc.) for the scrubber of the present invention.

Thus, it will be seen that the present invention may be provided with a slidable or a pivotable valve element. The angular disposition of the valve element serves to direct the flow of gas and atomized scrubbing liquid to the outside wall of the scrubber so that particle agglomerates (scrubbing liquid and suspended particulates) impinge upon the liquid film on the inner peripheral wall of the scrubber and thus become separated from the spinning gas stream. By positioning the valve element immediately adjacent the entrance port to the scrubber, the resultant height of the scrubber may be substantially reduced since the high velocity of the stream is being utilized to aid the centrifugal separation.

The term "orifice" as used in the following claims is intended to include the passageway intermediate the free edge 52 of slide valve element 42 and the edge 54 of spacer 44 of the embodiment of FIGURES 1–4, the passageway between the curved end portion 90 and the juxtaposed inner wall surface of the conduit 32 of the embodiment of FIGURE 5, and the passageway between the end 110 and the wall portion 112 in FIGURE 8.

The present invention may be embodied in other specific forms without departing from the spirit or essential attributes thereof and, accordingly, reference should be made to the appended claims, rather than to the foregoing specification as indicating the scope of the invention.

I claim:

1. A gas scrubber for gas laden with suspended particulates including an upright shell, said shell comprising a basal sludge outlet, a top clean gas outlet, and a cylindrical section intermediate said basal sludge outlet and said top clean gas outlet, a dirty gas inlet entering said cylindrical section tangentially thereof, a slidable valve element disposed within said dirty gas inlet at a spaced distance from the tangential entrance of said dirty gas inlet, said slidable valve element defining an orifice having an appreciably reduced cross-sectional area compared to the cross-sectional area of the adjacent portions of said dirty gas inlet, and a wash liquid nozzle spaced from the side of the slide valve element which is remote from the tangential entrance of the dirty gas inlet into the cylindrical section, with the discharge opening of said nozzle being in a position to impinge upon the slidable valve element, whereby the liquid discharge from said nozzle impinges upon the slidable valve element.

2. A gas scrubber in accordance with claim 1 in which the wash liquid nozzle is generally axially disposed in respect to the path of the dirty gas which enters dirty gas inlet.

3. A gas scrubber in accordance with claim 1 in which the slidable valve element is disposed across the dirty gas inlet at an angle to the plane which is perpendicular to the longitudinal axis of the dirty gas inlet, with the orifice defined by the slide valve element being further removed from the mouth of the dirty gas inlet than an adjacent portion of the slidable valve element.

4. A gas scrubber in accordance with claim 1 in which the slidable valve element is movable across the dirty gas inlet whereby the cross-sectional area of the orifice defined by the slide valve element may be selectively varied.

5. A gas scrubber in accordance with claim 1 in which the discharge opening of the nozzle is in a position to impinge upon a portion of the slide valve element which is remote from the orifice defined by the slide valve element.

6. A gas scrubber in accordance with claim 1 in which the slidable valve element comprises a flat plate.

7. A gas scrubber in accordance with claim 1 in which the slidable valve eelment is provided with an offset portion which defines the orifice.

8. A gas scrubber for gases laden with suspended particulates includnig an upright shell, said shell comprising a basal sludge outlet, a top clean gas outlet, and a cylindrical section intermediate said basal sludge outlet and said top clean gas outlet, a dirty gas inlet which tangentially enters said cylindrical section, a slidable valve element disposed within said dirty gas inlet at a spaced distance from the tangential entrance of said dirty gas inlet, said slidable valve element being disposed across the dirty gas inlet at an angle to the plane which is perpendicular to the longitudinal axis of the dirty gas inlet, said slidable valve element defining an orifice having an appreciably reduced cross-sectional area compared to the cross-sectional area of the adjacent portions of said dirty gas inlet, the orifice defined by said slide valve element being further removed from the mouth of the dirty gas inlet than an adjacent portion of said slide valve element, said slide valve element being movable across the dirty gas inlet whereby the cross-sectional area of the orifice defined by it may be selectively varied, and a wash liquid nozzle spaced from the side of the slide valve element which is remote from the tangential entrance of the dirty gas inlet into the cylindrical section, with the discharge opening of said nozzle being in a position to impinge upon the slide valve element, whereby the liquid discharge from said nozzle impinges upon the slide valve element.

9. A gas scrubber in accordance with claim 8 in which the wash liquid nozzle is generally axially disposed in respect to the path of the dirty gas which enters the dirty gas inlet.

10. A gas scrubber in accordance with claim 8 in which the discharge opening of the nozzle is directed towards a portion of the slide valve element which is remote from the orifice defined by the slide valve element.

11. A gas scrubber for gases laden with suspended particulates including an upright shell, said shell comprising a basal sludge outlet, a top clean gas outlet, a cylindrical section intermediate said basal sludge outlet and said top clean gas outlet, means for preventing liquid on the interior wall surface of said scrubber from entering into said clean gas outlet, said means including an annular flow space in the top portion of the wall of said gas scrubber, said clean gas outlet being in communication with the interior of said gas scrubber, a liquid-collecting trough in communication with said annular flow space, and a liquid drain-off conduit in communication with said trough, a dirty gas inlet which tangentially enters said cylindrical section, a slidable valve element disposed within said dirty gas inlet at a spaced distance from the tangential entrance of said dirty gas inlet, said slidable valve element defining an orifice having an appreciably reduced cross-sectional area compared to the cross-sectional area of the adjacent portions of said dirty gas inlet, and a wash liquid nozzle spaced from the side of the slidable valve element which is remote from the tangential entrance of the dirty gas inlet into the cylindrical section, with the discharge opening of said nozzle being in a position to impinge upon the slidable valve element, whereby the liquid discharged from said nozzle impinges upon the slidable valve element.

12. A gas scrubber for gases laden with suspended particulates including an upright shell, said shell comprising a basal sludge outlet, a top clean gas outlet, and a cylindrical section intermediate said basal sludge outlet and said top clean gas outlet, a dirty gas inlet which tangentially enters said cylindrical section, a moisture baffle plate radially disposed in said cylindrical section beneath the tangential entrance of said dirty gas inlet, a slidable valve element disposed within said dirty gas inlet at a spaced distance from the tangential entrance of said dirty gas inlet, said slidable valve element defining an orifice having an appreciably reduced cross-sectional area compared to the cross-sectional area of the adjacent portions of said dirty gas inlet, and a wash liquid nozzle spaced from the side of the slidable valve element which is remote from the tangential entrance of the dirty gas inlet into the cylindrical section, with the discharge opening of said nozzle being in a position to impinge upon the slidable valve element, whereby the liquid discharged from said nozzle impinges upon the slidable valve element.

13. A gas scrubber for gases laden with suspended particulates including an upright shell, said shell comprising a basal sludge outlet, a top clean gas outlet, and a cylindrical section intermediate said basal sludge outlet and said top clean gas outlet, means for preventing liquid on the interior wall surface of said scrubber from entering into said clean gas outlet, said means including an annular flow space in the top portion of the wall of said gas scrubber, said clean gas outlet being in communication with the interior of said gas scrubber, a liquid-collecting trough in communication with said annular flow space, and a liquid drain-off conduit in communication with said trough, a dirty gas inlet which tangentially enters said cylindrical section, a moisture baffle plate radially disposed in said cylindrical section beneath the tangential entrance of said dirty gas inlet, a slidable valve element disposed within said dirty gas inlet at a spaced distance from the tangential entrance of said dirty gas inlet, said slidable valve element defining an orifice having an appreciably reduced cross-sectional area compared to the cross-sectional area of the adjacent portions of said dirty gas inlet, and a wash liquid nozzle spaced from the side of the slidable valve element which is remote from the tangential entrance of the dirty gas inlet into the cylindrical section, with the discharge opening of said nozzle being in a position to impinge upon the slide valve element, whereby the liquid discharge from said nozzle impinges upon the slidable valve element.

14. A gas scrubber for gases laden with suspended particulates including an upright shell, said shell comprising a basal sludge outlet, a top clean gas outlet, and a cylindrical section intermediate said basal sludge outlet and said top clean gas outlet, means for preventing liquid on the interior wall surface of said scrubber from entering into said clean gas outlet, said means including an annular flow space in the top portion of the wall of said gas scrubber, said clean gas outlet being in communication with the interior of said gas scrubber, a liquid collecting trough in communication with said annular flow space, and a liquid drain-off conduit in communication with said trough, a dirty gas inlet which tangentially enters said cylindrical section, means for introducing liquid into said dirty gas inlet whereby agglomeration of the suspended particulates within the gas may be achieved, and a moisture baffle plate radially disposed in said cylindrical section beneath the tangential entrance of said dirty gas inlet.

15. A gas scrubber in accordance with claim 14 in which the upper face of the moisture baffle plate comprises a sloping surface.

16. A gas scrubber in accordance with claim 14 in which the dirty gas inlet comprises an orifice, and means for atomizing wash liquid prior to the passage of said wash liquid through the orifice.

17. A gas scrubber for gas laden with suspended particulates comprising an upright shell, a basal sludge outlet on said shell, a top clean gas outlet conduit centrally disposed on said shell, a cylindrical section on said shell intermediate said basal sludge outlet and said top clean gas outlet conduit, a dirty gas inlet conduit in communication with and extending tangentially from said cylindrical section to form an entrance port in the wall defining said cylindrical section, a selectively movable valve element disposed within said dirty gas inlet conduit at said port, said selectively movable valve element having a free edge in an open position of said valve element which cooperates with said dirty gas inlet conduit to define an orifice having an appreciably reduced cross sectional area compared to the cross sectional area of the adjacent upstream portion of said dirty gas inlet conduit, means for providing atomization of wash liquid and agglomeration of suspended particulates at said orifice, said last-mentioned means being related to said orifice so that atomized wash liquid and agglomerated particles pass through said orifice, with the portion of said cylindrical section in communication with said dirty gas inlet conduit being constructed and arranged to create a spinning gas stream within said cylindrical section when gas is introduced therein through said port.

18. A gas scrubber in accordance with claim 17 in which the means for providing atomization of wash liquid at said orifice includes a wash liquid nozzle adjacent to and spaced from a side of said valve element which is remote from said entrance port, the discharge opening of said nozzle facing a portion of said valve element so that liquid discharged from said nozzle impinges upon said portion of said valve element and forms a liquid curtain thereon.

References Cited in the file of this patent

UNITED STATES PATENTS

| 1,866,196 | Criqui et al. | July 5, 1932 |
| 1,879,107 | Couch | Sept. 27, 1932 |
| 1,894,744 | Hawley | Jan. 17, 1933 |
| 1,928,702 | O'Mara | Oct. 3, 1933 |
| 1,961,956 | Bleibtreu et al. | June 5, 1934 |
| 2,604,185 | Johnstone et al. | July 22, 1952 |

FOREIGN PATENTS

| 203,242 | Germany | Oct. 19, 1908 |
| 472,729 | Great Britain | Sept. 29, 1937 |
| 343,587 | Germany | Nov. 4, 1921 |